United States Patent Office 3,323,630
Patented June 6, 1967

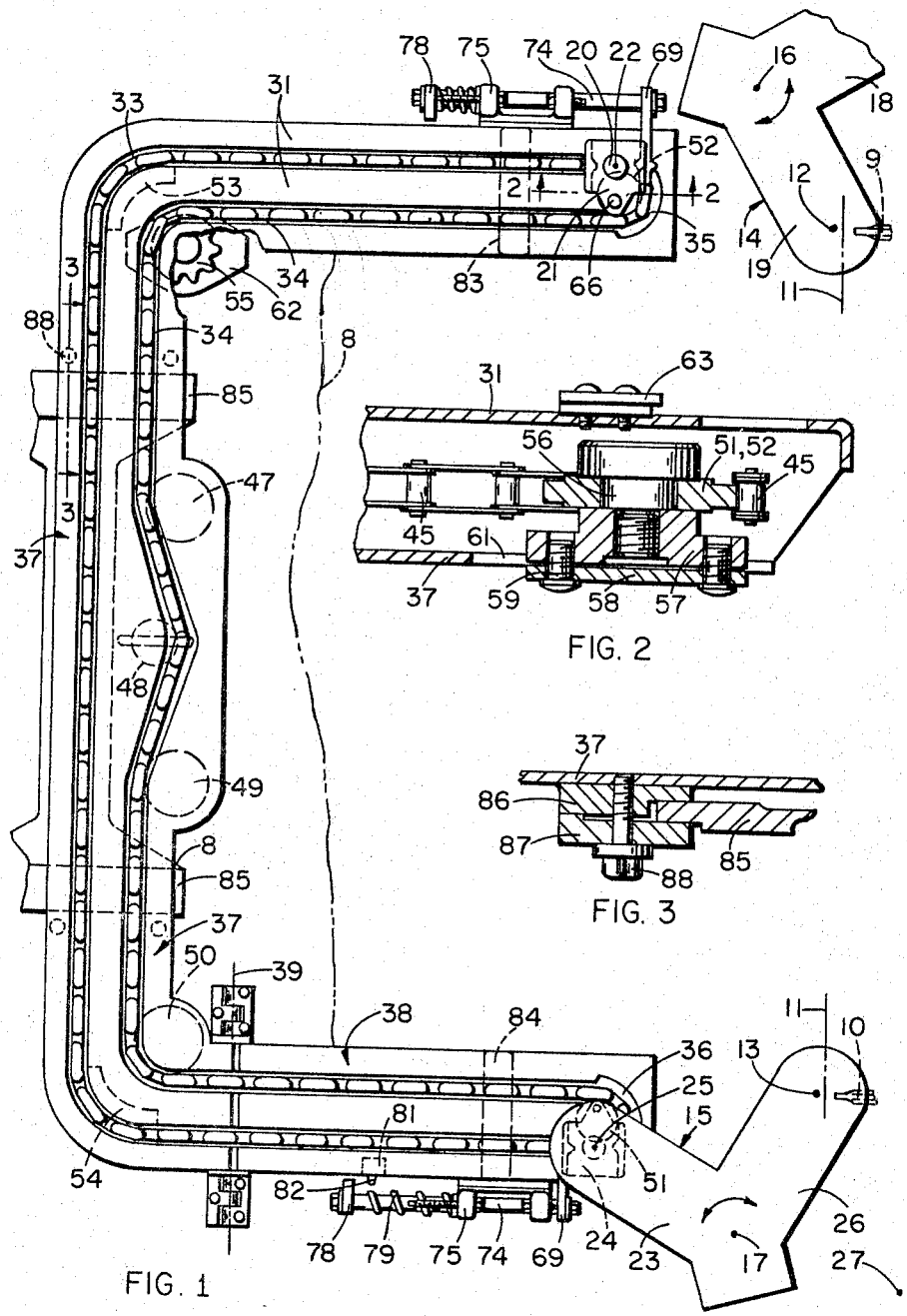

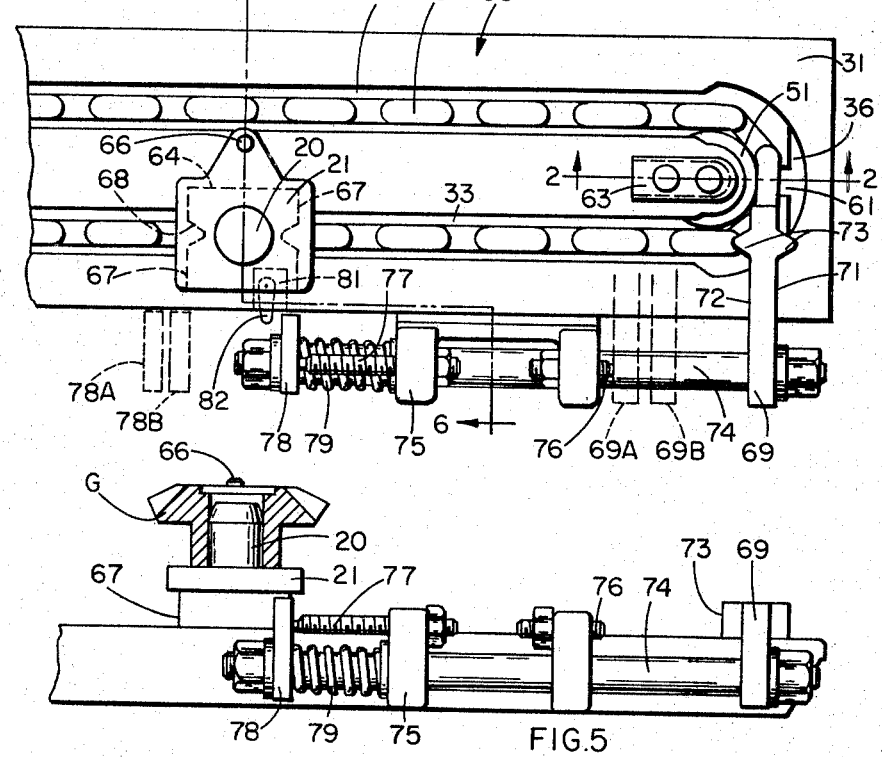
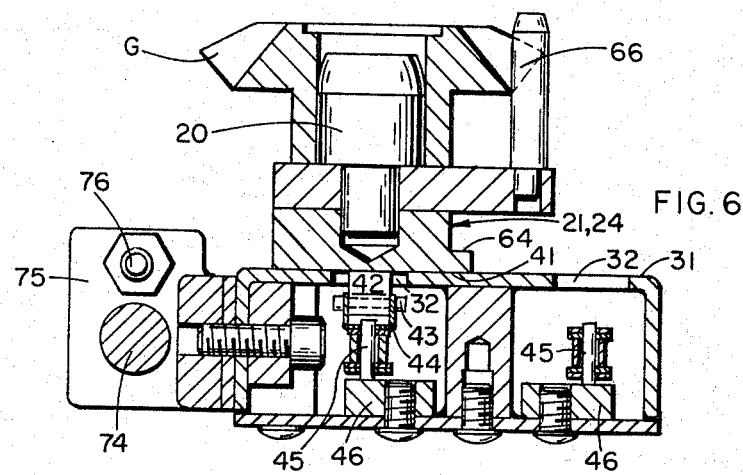

3,323,630
WORK TRANSFER MECHANISM FOR MACHINE TOOLS
Norman W. Fowler and Robert F. Sharp, both of Rochester, N.Y., assignors to The Gleason Works, Rochester, N.Y., a corporation of New York
Filed June 3, 1966, Ser. No. 555,160
11 Claims. (Cl. 198—19)

The present invention relates to a mechanism for transferring workpieces, on gear cutting machines or the like, between two spaced machine stations, for example from a station onto which gears are unloaded after rough cutting of their teeth to a station from which they are loaded for finish cutting of the teeth.

The object of the invention is a simple and compact mechanism capable of rapid yet smooth operation to accurately register the work carrying members or carriages with the machine stations. A further object is such a mechanism in which only two such carriages are required, one for returning empty to the first station while the other carries a workpiece to the second station.

A mechanism according to the invention comprises an endless flexible element supported upon a track having an endless guide formation which passes both stations, two work carriages guided by said track and connected to said flexible element in equally spaced relation therearound, said track and flexible element being so arranged that when either carriage is at either station the other carriage is at the other station, a reversing motor drive for said flexible element to move said carriages back and forth between said stations, and abutment means for stopping both carriages in the same position on the track at both stations.

A preferred embodiment of the invention is shown in the accompanying drawings, wherein:

FIG. 1 is a plan view of the mechanism mounted on a gear cutting machine;

FIG. 2 is a vertical section in plane 2—2 of FIG. 1 or FIG. 4;

FIG. 3 is a detail vertical section in plane 3—3 of FIG. 1;

FIGS. 4 and 5 are fragmentary plan and side views; and,

FIG. 6 is a sectional view in plane 6—6 of FIG. 4.

The gear cutting machine fragmentarily illustrated in FIG. 1 is of the general type disclosed in Patent 3,229,585, granted Jan. 18, 1966, to T. A. Deprez et al. and in application Ser. No. 537,243 filed Mar. 24, 1966, by W. G. Buchanan et al. It comprises a frame 8 supporting two widely spaced disc-shaped cutters rotatable about the same horizontal axis and two spindles each of which supports a workpiece in engagement with one of the cutters. Only fragments of the peripheries of the two cutters, 9 and 10, appear, the cutter axis being to the right of the view, parallel to axis 11. The work spindles themselves are not shown but their axes are designated 12 and 13. For loading and unloading the spindles, these axes 12 and 13 are swung into vertical position about axis 11 to which they are perpendicular and offset. Two double-armed work carriers, 14 and 15, are supported, by housings mounted on the frame 8, for vertical motion, respectively along axes 16 and 17, and for oscillation about these axes through an angle of 90°, as indicated by the arrows around these axes. Each arm of each carrier has a jaw-like gripper on its lower side adapted to engage and carry workpieces to and from the work spindles of the machine. The arms and grippers, and their actuating means, may for this purpose be generally similar to the corresponding mechanisms disclosed in afore-mentioned application Ser. No. 537,243.

In each cycle of operation, carrier 14 moves downwardly along axes 16 causing the gripper on arm 18 thereof to engage a work blank in a suitable magazine (not shown) and the gripper on arm 19 to engage a rough cut gear G on the work spindle (axis 12); then moves upwardly to strip the blank and roughed gear from the magazine and spindle; then swings clockwise by 90° about axis 16 to align the blank and the roughed gear respectively with axis 12 and with a pin 20 of a carriage 21 in the machine station represented by axis 22; then moves downwardly along axis 16 and releases the blank and gear, thereby depositing them respectively on the work spindle and on carriage 21; and then rises along and swings counterclockwise by 90° about axis 16 to its starting position. After the machine rough cuts teeth in the gear blank the operating cycle of the carrier is repeated. Simultaneously with each cycle of operation of carrier 14, similar carrier 15 operates through a corresponding cycle during which arm 23 carries a roughed gear from another carriage 24, in the machine station represented by axis 25, to the work spindle at axis 13; while arm 26 carries a finish cut gear from the latter spindle to a discharge station, represented by axis 27.

The mechanism of the present invention includes the two carriages 21 and 24, which are identical, and the supporting and actuating means for them. The supporting means comprises a fabricated track of box-like form in vertical section, as shown in FIG. 6, and of generally U-shape in plan, FIG. 1. This track structure provides a substantially flat horizontal upper surface 31 on which the carriages may slide and a continuous guide formation comprising a slot 32 extending through this upper surface. The slot consists of outer and inner U-shaped sections 33 and 34, one within the other, with the legs of these two sections connected by semi-circular sections 35 and 36. The legs of the U-shaped sections extend along the opposite sides of the machine while the bases of these sections extend along the back of the machine. Carriage 21 traverses slot section 33, and carriage 24 slot sections 34, 35 and 36. The track consists of two substantially rigid sections 37 and 38 hinged together on axis 39 to allow the distal end of section 38 to move up and down in unison with the finishing work spindle and the housing of carrier 15, such motion of the spindle being required by the cutting action of the machine, explained in aforementioned Patent 3,229,585. Track section 37 remains rigid with the machine frame during the cutting action.

Each carriage has a hardened surface 41 for sliding on the track surface 31 and, extending through the slot 32, a stem 42 pivotally connected by a pin 43 and bracket 44 to an endless flexible element 45. This element comprises a pivoted link chain which extends around the track, within the latter's box structure, beneath the slot 32. The chain is slidably supported by bars 46 secured to the track sections beneath the straight portions of slot 32 and is guided by six rollers, designated 47–52, curved guide shoes 53 and 54, and sprocket 55. The guide rollers and guide shoes are all supported by the track, and several of the rollers, 48, 51 and 52, are adjustable horizontally to adjust the tension of the chain. For example, as shown in FIG. 2, roller 52 is rotatable on a pin 56 screw-threaded to a support member 57 that is clamped to the bottom of track 37 by a plate 58 and screws 59. The support member and plate bridge a slot 61 formed in the track, and a guide tongue on the bottom of the plate extends into the slot. Upon loosening of the screws 59 the support member may be adjusted lengthwise of the slot.

The carriages are equally spaced around the chain 45. That is, both spans of chain between the two carriages are of the same length, contain the same number of links. Hence with the chain tensioned to the desired degree, both carriages can be made to stop with their pins 20 in register with stations 22 and 25, after one-half turn of the chain around the track in either direction. The chain is driven by reversible hydraulic motor 62 which is secured to the track and has sprocket 55 secured to its drive shaft. The carriages pass each other near the central chain guide roller 48, and the spacing of the track slot sections 33 and 34 is widened at this point to permit such passing.

For accurate guidance of the carriages as they approach stations 22 and 25, and especially to hold surfaces 41 flat against track surface 31, a gib 63, FIGS. 2 and 4, having a rounded nose concentric with adjacent guide roller 51 or 52 is secured onto the track adjacent each of these rollers. A flange 64, FIGS. 4 and 6, on each carriage is adapted to engage under the lips of the gibs 63. Each carriage has a pin 66 for for engaging in a tooth slot of the work gears G so that the latter will be held in the correct angular position to be engaged by the gripper on arm 23 and thus be placed on the work spindle on axis 13 in the correct angular position for finish cutting. The gibs 63 and flanges 64, and the stop means next to be described, cooperate to hold the carriages square with the track in their terminal positions, i.e. as viewed in FIG. 1, with the pins 66 spaced from pins 20 in a direction parallel to axis 11. For this purpose each carriage has parallel front and rear surfaces 67 each of which has a recess 68 and is adapted to seat against a stop or abutment member 69 having parallel front and rear faces 71 and 72, each such face having a projection 73 for centering engagement in a recess 68. The stop members 69, one of which is adjacent each of stations 22 and 25, are slidable on track surface 31 and each has rigid therewith a rod 74 slidable in a bracket 75 secured to the track. Each bracket has two adjustable stop screws, 76, and 77, the first of which is abutted by stop 69 when the latter is in position 69A, FIG. 4, and the second of which is abutted by a member 78 that is rigidly secured to rod 74. A spring 79 on the rod is confined between bracket 75 and member 78.

An electric reversing switch 81, FIG. 4, mounted on the track, has a pivoted actuating arm 82 in the path of the adjacent member 78. This switch is in the control circuit of a solenoid operated reversing valve (not shown) for motor 62. Upon de-energization of the control circuit this valve will remain in the position to which it was last operated, i.e. the position to run the rotor either clockwise or counterclockwise, until the circuit is again energized. The circuit includes electric switch means responsive to operation of the carriers 15 and 18, so that immediately after each such operation of carriers the solenoid valve is reversed. With the carriages in the position shown in FIG. 1, the stop 69 adjacent carrier 14 has been moved by the carriage 21 to its right limit position wherein member 78 abuts stop screw 77 and thereby stops the carriage in station 22, and carriage 24 is stopped in station 25 by abutment with adjacent stop 69 and by abutment of the latter (in position 69A of FIG. 4) with stop screw 76. The motor 62 is stalled but continues to exert a counterclockwise torque on sprocket 55. Switch arm 82 has been swung clockwise from its spring-held neutral position, in which it is shown, by member 78 adjacent station 25, conditioning the control circuit for clockwise operation of motor 62 upon completion of the next operating cycle of carriers 14, 15.

Upon such completion, the control circuit is energized, reversing the solenoid valve, causing clockwise rotation of sprocket 55 and hence movement of the carriage 21 toward station 25. As it approaches the latter, it moves the stop 69, FIG. 4, from position 69B in which the stop is held by spring 79, to its full line position, against the resistance of the spring. In this position, member 78 engages stop screw 77, arresting the carriage at station 25. As this terminal action takes place, member 78 passing by switch arm 82 swings it counterclockwise, conditioning the control system to operate the motor counterclockwise in the next cycle. However in the present cycle the motor continues to run clockwise until stalled by abutment of the carriage 21 with the stop 69 at station 25 and the member 78 with adjacent stop screw 77, and by the simultaneously occurring abutment of carriage 24 with the stop member 69 adjacent station 22, and of this stop member with stop screw 76. After the next following cycle of operation of the carriers, the motor 62 operates counterclockwise to return the parts to the condition shown in FIG. 1, the final impact being reduced by compression of the spring 79 adjacent station 22.

The track sections 37 and 38 rest on pads 83 and 84 which are respectively stationary with respect to the machine elements which support the roughing and finishing work spindle housings, and section 37 is adjustably secured to plate 85 of the machine frame. As shown in FIG. 3, the bottom plate of track section 37 has welded thereto bars 86 which are clamped to plate 85 by clamp members 87 and screws 88. Upon loosening of these screws the track may be adjusted horizontally to the right or left in FIG. 1. This adjustment, which shifts the track relative to stations 22 and 25, together with adjustment of stop screws 76 and 77, which adjust the stops relative to the track, enables the pins 20 of the carriages in their limit positions to be brought into accurate register with the two stations.

Having now described the preferred embodiment of my invention, what I claim is:

1. A mechanism for transferring workpieces, on gear cutting machines or the like, between two spaced machine stations, for instance unloading and loading stations of a machine, comprising an endless flexible element supported upon on a track having an endless guide formation which passes both stations, two work carriages guided by said track and connected to said flexible element, being so arranged that when either carriage is at either station the other carriage is at the other station, a reversing motor drive for said flexible element to move said carriages back and forth between said stations, and abutment means for stopping both carriages in the same position on the track at both stations.

2. A mechanism according to claim 1 having means for adjusting said track relative to said stations to thereby change the effective relative lengths of the two stretches of said guide formation between said stations.

3. A mechanism according to claim 1 having means for adjusting the tension of said flexible element, such means comprising a guide for a portion of said element between said stations, said guide being adjustable relative to said track.

4. A mechanism according to claim 1 having means for adjusting said abutment means relative to said track to bring the terminal positions of the carriage into register with said stations.

5. A mechanism according to claim 1 having (a) means for adjusting said track relative to said stations to thereby change the effective relative lengths of the two stretches of the guide formation between said stations, (b) means for adjusting the tension of said flexible element, said means comprising a guide for a portion of said element between said stations, said guide being adjustable relative to said track, and (c) means for adjusting said abutment means relative to said track to bring the terminal positions of the carriages into register with said stations.

6. A mechanism according to claim 1 in which said abutment means comprise a member, adapted for abutment by both carriages, movable back and forth in substantially the direction of the guide formation at the adjacent station, and two stops respectively for limiting said back and forth motions of said member.

7. A mechanism according to claim 6 in which there is such a member and two stops adjacent each station.

8. A mechanism according to claim 6 having a resilient biasing means to urge said member away from one stop and yieldably resisting motion into said adjacent station of the carriage which moves said member against said one stop.

9. A mechanism according to claim 6 in which said stops are adjustable relative to the track to effect registration of the carriages with said stations.

10. A mechanism according to claim 1 including a work carrier adjacent each station, one carrier being adapted to bring workpieces to one station and the other carrier being adapted to take workpieces away from the other station, said two carriers being movable substantially in unison, and control means for said reversing motor drive coordinated with the carriers to cause the drive to operate the flexible element after each operation of the carriers, said control means including means to reverse the drive upon each successive operation thereof.

11. A mechanism according to claim 1 in which said track comprises two substantially U-shaped guide sections, one within the other, extending along two sides and one end of the machine, and substantially semi-circular guide sections connecting the adjacent ends of the two U-shaped guide sections.

References Cited

UNITED STATES PATENTS 2,793,733    5/1957    Karageorgieff _____ 198—19

EVON C. BLUNK, *Primary Examiner.*

E. A. SROKA, *Assistant Examiner.*